Patented Sept. 9, 1952

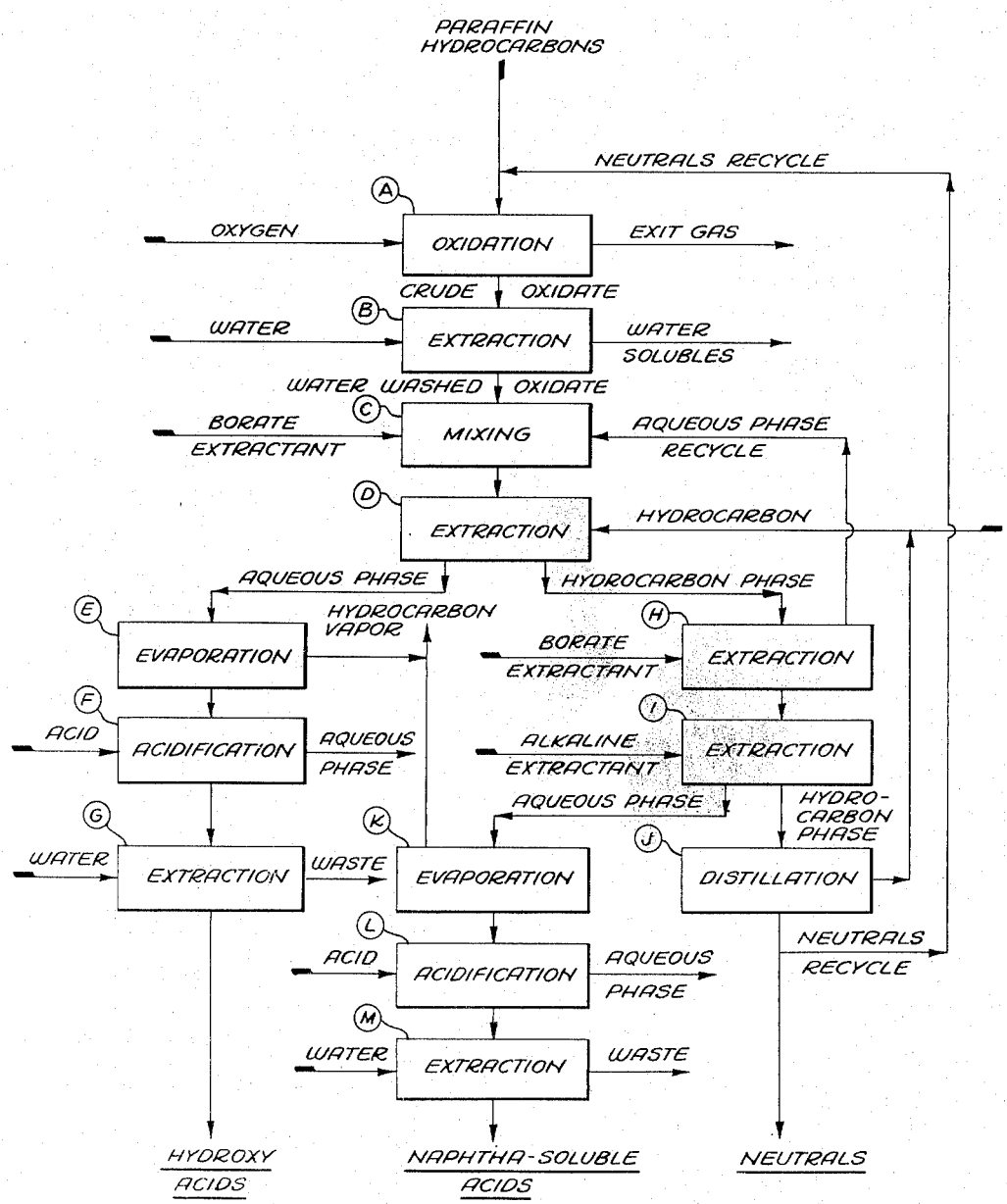

2,610,197

UNITED STATES PATENT OFFICE 2,610,197

PRODUCTION AND REFINING OF ORGANIC ACIDS

Orin D. Cunningham, Long Beach, Calif., assignor to Union Oil Company of California, Los Angeles, Calif., a corporation of California Application July 5, 1947, Serial No. 759,144

27 Claims. (Cl. 260—413)

This invention relates to the production of organic acids and particularly to the production of hydroxy acids, carboxylic or fatty acids, and ester acids which have between about 6 and 40 carbon atoms per molecule from selected hydrocarbon fractions by oxidation. This invention further relates to the separation of these acids from the oxidized material formed in the oxidation process and to the refining and purification of these acids. The method of separation and purification of the organic acids as hereinafter more fully described is also applicable to crude organic acids formed by other processes than oxidation including fat splitting, sulfonation of mineral oils, etc.

The higher molecular weight organic acids may be used as starting materials or intermediates in the production of a wide variety of synthetic organic chemicals which may be used as detergents, wetting agents, emulsifiers for specific application, jelling agents, synthetic soaps and surface active agents. The preparation of the metal salts of higher molecular weight acids yields valuable agents which are applicable as drying agents in paints, additives for greases, and lubricating oils, and compounds employed in the preparation of cutting oils. The hydroxy acids in particular, which contain a hydroxyl group in addition to the carboxylic acid group, may be pyrolyzed to from high molecular weight alcohols and ketones. The hydroxy acids, having two functional groups, may be employed in the preparation of modified alkyd resins, and with other polymerizable constituents in the formation of special polymers for the production of plastics.

In any process for the preparation of organic acids such as fat splitting, oxidation of waxes, oxidation of liquid petroleum fractions, sulfonation of mineral oils, and the like, neutral constituents remain with the acids which are very difficult to separate therefrom. For example, in the process of fat splitting, hydrocarbons are formed through the mechanism of decarboxylation and are quite difficult to recover from the product. Similarly, in the oxidation of waxes or other petroleum fractions, neutral constituents such as unoxidized paraffin, naphthene hydrocarbons and nonacidic oxidized constituents such as alcohols, ketones, and esters, remain with the acid and are difficult to separate.

There are a number of ways for recovering organic acids from mixtures thereof with neutral components, which are familiar in the art. In general, these methods consist in treating the crude acids with an aqueous solution of a caustic alkali such as sodium or potassium hydroxide or with an aqueous solution of sodium carbonate wherein the organic acids combine with the alkali metal to form water soluble soaps which enter the aqueous phase. Stratification is then induced either by settling alone or in the presence of emulsion breakers accompanied by heating.

The aqueous phase is separated and acidified whereupon the soaps are decomposed and the free acids separate out as a distinct phase which may then be separated and dried. Such extraction methods with caustic alkali or alkali carbonates have several disadvantages. The action of alkaline extractants and those forming extracts which are strongly alkaline including aqueous solutions of hydroxides and carbonates of the alkali metals, may cause a degradation and decomposition of certain types of acids present. A class of acids known as ester acids formed through esterification of a hydroxy acid through the hydroxy group with another acid are quite easily saponified and thus degraded by the action of strong alkalies.

Another major disadvantage of this method of purification lies in its ineffectiveness in separating certain neutral constituents from the acids when extractants of high pH are employed. In many cases very stable emulsions or possibly gels are formed upon the addition of the aqueous alkali, caustic or carbonate, which gives rise to the retention in the aqueous soap phase of a large percentage of the neutral components originally present. Upon subsequent decomposition of the alkali soaps to produce the acid these neutral constituents remain as impurities therein.

The organic acids, present in aqueous solution as soluble alkali metal soaps, are recovered by acidifying the aqueous solution with a sufficient quantity of strong mineral acid to decompose the alkali metal-organic acid soap and in addition to neutralize the excess alkali present. The alkali employed for extracting the organic acids is not economically recoverable, but is converted into useless salt solutions which may present a serious disposal problem.

Disadvantages in conventional separation methods include emulsion formation, contamination of acids with neutrals, and degradation of acids. Disadvantages which result from using strongly alkaline extractants and the wasteful formation of useless salt solutions are rectified in the process according to my invention as hereinafter more fully described.

An object of this invention is to provide an improved process for the production and purification of organic acids having between about 6 and 40 carbon atoms per molecule from selected hydrocarbon fractions.

A further object of the present invention is to provide a method for the efficient separation of different classes of organic acids present in crude mixtures thereof.

Another object of the present invention is to provide a method for the separation of mixtures of organic acids in such a manner that chemical reagents employed in the separation may be easily and economically recovered and reused in the process.

A further object of the present invention is to provide a process wherein a selected hydrocarbon or hydrocarbon fraction may be substantially converted into the higher molecular weight organic acids and separated into substantially pure fractions each fraction containing a particular class of organic acid.

Other objects and advantages of this invention will become apparent to those skilled in the art as the description thereof proceeds.

Briefly, my invention comprises the liquid phase oxidation of selected highly paraffinic hydrocarbon fractions to produce a crude oxidation product containing numerous acidic constituents including the fatty acids, hydroxy acids, ester acids, etc., the molecules of which have carbon skeletons with from 1 to about 40 carbon atoms per molecule together with neutral constituents consisting of unoxidized hydrocarbons and nonacidic oxygenated compounds. The resolution of a crude mixture of the lower molecular weight organic acids, from 1 to about 6 carbon atoms per molecule, is relatively simple and it is to the improvement in the resolution of mixtures of organic acids having between about 6 and about 40 carbon atoms per molecule that the present invention is directed.

The crude oxidized product, previously described, is water washed to remove the lower molecular weight water-soluble acids to form a water-insoluble raffinate containing the higher molecular weight acids with molecules having between about 6 and about 40 carbon atoms per molecule. The water-insoluble raffinate is subsequently subjected to a fractionation process according to my invention which involves extractions with a concentrated borate solution forming a borate-hydroxy acid complex, as hereinafter more fully described, to effect the separation of hydroxy acids from the raffinate which includes naphtha-soluble acids and neutrals comprising unoxidized hydrocarbons and nonacidic oxidized constituents.

I have found that pronounced advantages may be realized in employing concentrated aqueous borax extractant solutions instead of the aqueous alkali solutions normally used.

First, aqueous solutions of borax and hydroxy acid soap complex are not alkaline, but have a pH of about 6.0. Saponification of the ester acids with resulting degradation does not occur and high recoveries of the original acids result. Second, the borax solution used in extracting hydroxy acids does not form stable emulsions with nonpolar substances present in the water-insoluble raffinate previously described. These substances include unoxidized hydrocarbons and the nonpolar solvent employed to aid the separation. Third, the aqueous borax solutions have sufficiently high specific gravity to permit rapid phase separation, that is, the separation of the aqueous phase from the nonpolar solvent phase. Fourth, the reagent borax employed in the extractant solution is readily and economically recoverable from spent solutions.

The fractionation operation employing aqueous borax solutions as hereinafter more fully described produces fractions which are quite pure with respect to a given class of organic acids, i. e., the hydroxy acid fraction is substantially free from contaminants consisting of the fatty acids or neutral constituents. Neutral materials comprising unoxidized paraffinic hydrocarbons or hydrocarbons formed in the oxidation through the mechanism of decarboxylation are also separated and may be returned to the preliminary part of the process for retreatment. Thus, the oxidation and fractionation steps of the process are integrated so that a particular hydrocarbon fraction may be substantially completely converted to acidic bodies with a minimum amount of neutral or nonacidic constituents being formed.

The process of the present invention which includes individual operations in the combined oxidation and fractionation method for producing the higher molecular weight organic acids may be more clearly understood by reference to the accompanying diagram which is a schematic diagram of the over-all process of oxidation and fractionation and depicts the individual steps in the fractionation operation.

Referring particularly to the diagram, the feed which comprises a petroleum paraffin wax containing predominantly paraffin hydrocarbons having between about 24 and 40 or more carbon atoms per molecule is subjected in step A to a liquid phase oxidation by contact with a gas containing free oxygen such as air, oxygen enriched air, oxygen, or other suitable gas. This operation is preferably carried out under pressures which may vary between about 0.2 and 20 atmospheres and preferably between normal atmospheric pressure (1 atmosphere) and about 10 atmospheres and at a temperature which is above the melting point of the wax being oxidized or between about 100° C. and 200° C. for normally liquid hydrocarbon fractions. The material is melted and is introduced into a reaction vessel which is equipped with means for heating and cooling. The vessel is preferably in the form of a vertical column provided with heating coils in the lower portion and is partially filled with the liquid to be oxidized so as to leave ample foam and vapor space in the upper portion. The liquid wax is then heated to between about 120° C. and about 150° C., which is the preferred temperature range, by means of the heating coils and a gas containing free oxygen such as air under pressure is passed into the bottom of the vessel through a distributor which insures good dispersion of the air in the form of small bubbles throughout the liquid. This insures efficient air utilization in the oxidation. The volumetric rate at which the air or other oxidizing gas is introduced may vary between about 1 and 20 cubic feet per barrel of hydrocarbon per minute. The barrel herein referred to is the 42-gallon barrel of the petroleum industry. The preferred air rate is between about 10 to about 15 cubic feet per barrel per minute. The oxidation is performed under pressure which increases the oxidation rate and also inhibits excessive evaporation of the desired oxidation products while allowing the evaporation of some of the lower molecular weight acidic oxidation products. These may be subsequently recovered and purified according to conventional processes. The removal of the lower molecular weight acids appears to aid the oxidation. The effluent gases leaving the oxidizing vessel may be cooled so as to recover the lower molecular weight normally liquid oxidation products. These products include formic, acetic, and propionic acids and other oxidized materials.

The oxidation operation, above described as a batch process conducted in a single vessel, may be conducted on a continuous basis in a series of smaller vertical reaction vessels each equipped for heating and cooling and provided with means for introduction of the gas containing oxygen. The paraffin wax may be passed successively through the series of vessels to undergo oxidation. The advantages offered by such a mode of operation include steady flow of product, uniform product quality, ease of control of the operation, and others.

Following the initiation of the oxidation reaction less heat is required to maintain the desired temperature because of heat developed by the reaction. Thus, it is sometimes necessary to discontinue heating and remove heat by cooling the reactor to maintain the desired temperature. Whether the operation is exothermic or endothermic is largely determined by the pressure of the operation, temperature, and the amount of air or other oxygen-containing gas employed in the reaction as well as the size of the oxidation vessel.

The crude oxidate produced in oxidation step A contains a certain quantity of water-soluble low molecular weight acids and other oxygenated materials not removed with the effluent gases. Conventional separation methods are applicable to these acids while the separation method according to my invention is applicalbe to greatest advantage in resolving the mixtures of higher molecular weight acids. The water-soluble acids are, therefore, removed in step B by extraction with water. The extraction is performed under pressure if necessary and at a temperature sufficient to liquefy the crude oxidate. Apparatus for this extraction may comprise either a series of mixing vessels or a conventional extraction column.

The acid number of the water-washed oxidate thus formed is between about 100 and 175 mg. KOH per gram, generally about 150 compared to an acid number of between 200 and 300 for the crude oxidate. The water-washed oxidate contains oxygenated constituents having between about 6 and about 40 carbon atoms per molecule and is employed as feed to step C.

I have found that the hydroxy acids and the hydroxyester acids present in the water-washed oxidate may be solubilized in an aqueous solution of borax or sodium tetraborate decahydrate. A molecular complex is apparently formed between the hydroxy acids, apparently fail to form tween the borax and the hydroxy acids, the complex being water-soluble and forming aqueous solutions having many of the properties of soap. Further, the remaining acids, i. e., those other such complexes, but are soluble in nonpolar solvents such as petroleum naphthas and are therefore referred to as the naphtha-soluble acids. The hydroxy acids are only slightly soluble in naphtha.

The fractionation of hydroxy and naphtha-soluble acids present in the water-washed oxidate, as hereinafter more fully described, is based upon the solubility and complex formation phenomena. The separation of the individual classes of acids from the oxidate comprises essentially three separate operations which include:

First, the water extraction of the crude oxidate to remove low molecular weight water-soluble acids which may subsequently be recovered by conventional fractionation methods, second, the aqueous borax extraction of the water-washed oxidate to form soluble complexes with the hydroxy acids, thereby forming an aqueous phase containing hydroxy acids and a naphtha phase containing the naphtha-soluble acids and neutrals, and third, extracting the naphtha phase with an aqueous solution of an alkali metal carbonate to recover therefrom the naphtha-soluble acids by converting them into their water-soluble alkali metal soaps.

These three are the major operations involved in the fractionation method according to my invention and the complete series of steps are shown in the figure which will subsequently be more completely described.

The crude paraffin wax oxidate acids to be separated are heated to a temperature above the melting point, or to between about 25° C. and 75° C. to render the acids in a completely liquid condition. These liquefied acids are contacted in step C with an aqueous borax solution having a borax concentration of between about 4 and 50 weight per cent. The oxidate is thoroughly mixed with the borax solution in step C so as to complete the formation of the soap complex, the amount of borax solution employed being equivalent to about 95% of the hydroxy acids present in the wax oxidates as hereinafter more fully described. The material withdrawn from step C consists of a heated liquid in two phases, an aqueous soap complex phase containing the hydroxy acids solubilized therein by the borax and the naphtha-soluble acid phase.

The concentration of the borax solution employed is preferably greater than about 4 weight per cent sodium tetraborate-decahydrate in water and may run as high as about 50 weight per cent at elevated temperatures. The borax solution used in the borax extractions may consist of water containing completely dissolved borax or in some cases may consist of a saturated solution or a slurry of borax. I prefer, however, to use borax solutions having concentrations between 5% and 20% borax and employ temperatures sufficiently high that no solidification of the wax oxidate acids occurs when the liquefied oxidate is contacted with the borax solution. Preferably the borax extracting solution is heated to the same temperature as the liquefied wax oxidate acids to be separated.

The hydroxy acid-borax soap complex, which is presumably formed between the hydroxy acids and the borate ion of the borax solution, comprises about 3 mols of hydroxy acid per mol of borax. The exact nature of the molecular complex formed has not been accurately determined, but it is believed that the hydroxy group as well as the OH of the carboxyl group enter into the complex formation. The soap complex thus formed has been found to be more highly ionized than either the hydroxy acid or the boric acid formed through hydrolysis of the borax in aqueous solution as indicated by higher electrical conductivity.

The naphtha-soluble acids are somewhat soluble in the aqueous complex phase and in order to avoid contamination of the hydroxy acids by naphtha-soluble acids and neutrals, the amount of borax extractant used to contact the water-washed oxidate contains somewhat less than the theoretical quantity of borax required to complex with all of the hydroxy acids present. The preferred amount of borax is about 90% to 95% of theory. In other words, the preferred quantity of borax as borax extractant solution is between about 0.90 and 0.95 mol of borax for every 3 mols of hydroxy acid.

The amount of hydroxy acid present in crude paraffin wax oxidate has been found to be approximately one-third of the total acid present or about equal to one-half of the acid in the water-washed oxidate. However, in any given case the proportion of hydroxy acids present may be approximately determined by dissolving one volume of the wax oxidate in about 25 volumes of a petroleum fraction boiling in the gasoline range, the petroleum fraction serving to dissolve the naphtha-soluble acids and neutrals and leaving the hydroxy acids undissolved. A measure of the volume of the insoluble phase serves as an indication of the amount of hydroxy acids present in the material.

The soap complex formation in step C may be carried out at any temperature between about 20° C. and about 100° C., the optimum temperature being above the melting point of the oxidate acids. It is also possible to perform the complex formation under pressures of between about 1 and 10 atmospheres to attain higher temperatures at which the rate of complex formation is quite rapid. Generally, a temperature of between 5° C. and 50° C. above the melting point of the mixture of acids is satisfactory. For paraffin wax oxidates having a melting point of about 35° C., I have found that a temperature of about 70° C. is satisfactory.

The aqueous soap complex and the naphtha-soluble acids as immiscible liquids are introduced into step D wherein the material is extracted with between 1 and 10 volumes and preferably with about three volumes of a nonpolar solvent per volume of soap complex and naphtha soluble acids. The nonpolar solvent is preferably a hydrocarbon solvent such as a petroleum naphtha, hexanes, or heptanes, etc. This extraction is conveniently accomplished in an extraction type column packed with a suitable material such as rings, saddles, etc., but also may be carried out in a series of mixing vessels. The use of a naphtha such as hexane in connection with the borax extraction solution permits an unusually sharp separation between the hydroxy and naphtha-soluble acids present in the system. The hydrocarbon phase containing naphtha-soluble acids and neutrals formed in step D is separated from the aqueous borax soap complex phase and is conducted to step H for further treatment as hereinafter more fully described.

The success of the borax solvent extraction process employed in obtaining these borax soap complexes comes in the use of concentrated borax solutions. For some reason stable emulsions are not formed when aqueous borax solutions having more than about 4 weight per cent borax are used. Solutions containing less than about 4% borax form very stable emulsions which are similar to those obtained in attempting to separate these acids with strongly alkaline solutions. It is for this reason that the limits of borax concentration of from about 5 to about 20 weight per cent or higher are preferred.

The aqueous soap complex phase is introduced into step E wherein the aqueous soap complex solution is heated so as to evaporate any small amount of dissolved hydrocarbon which may be returned to step D. The hydrocarbon-free soap complex is removed from step E and introduced into step F wherein a mineral acid is added causing the decomposition of the soap complex with the subsequent formation of a free hydroxy acid phase. An aqueous phase containing boric acid, any excess of mineral acid employed in the acidification step F, and the sodium salts of the mineral acid is formed. The preferred acid is sulphuric having a concentration of about 40% to 50%; however, virtually any concentration of acid may be used. The moderately concentrated acids are preferred because less difficulty is encountered in subsequent purification operations from the excessive amounts of water of dilution present when dilute acids are employed. The amount of acid required amounts to about 1 equivalent acid per equivalent of borax and is just sufficient to convert the borax present in the complex to boric acid. This amount will serve to substantially completely decompose the soap complex and liberate the organic acid held therein. If desired, however, an excess of acid may be employed in which case boric acid is salted out as a crystalline phase and may be separated from step F, reconverted to its sodium tetraborate salt, and re-employed in the process. I have found that by employing an excess of 2 mols of sulphuric acid per mol of borax and evaporating about 50% of the water present in the aqueous phase, an 80% by weight recovery of boric acid may be effected.

The free hydroxy acid formed in step F is introduced into step G and subjected therein to a water extraction to remove small amounts of mineral acid present which were used in the acidification in step F. The hydroxy acid, which is substantially free from unoxidized hydrocarbons or other neutral materials, naphtha soluble acids, or other acidic contaminants, is removed from step G as a dark brown viscous liquid at room temperatures. This material contains hydroxy acids and hydroxy ester acids having between about 6 and about 40 carbon atoms per molecule.

The hydrocarbon or naphtha phase, containing naphtha-soluble acids, neutral materials, and a small amount of hydroxy acids, is introduced into step H from step D as previously described. Within step H the hydrocarbon is again contacted with further quantities of an aqueous borax solution which is equivalent to somewhat more than 5% to 10% of the remaining hydroxy acids present in the hydrocarbon phase. As previously described, the amount of borax as borax extractant employed in the first borax extraction was equivalent to between 90% and 95% of hydroxy acids present. This extraction may be also conveniently carried out in either an extraction column or a series of mixing vessels and the aqueous borax extract phase may be conveniently recycled to step C for retreatment. The hydrocarbon phase removed from step H is substantially free of hydroxy acids and contains the naphtha-soluble acids together with neutral materials present in the wax oxidate acid feed. This hydrocarbon phase is introduced from step H into step I.

The hydrocarbon phase is contacted in step I with a dilute aqueous alkaline extractant containing a basically reacting alkali metal salt such as a bicarbonate, carbonate, or hydroxide of an alkali metal in an extraction type column or a series of mixing vessels. This alkaline extractant preferably contains between about 1% and 10% by weight of an alkali metal carbonate. The extraction serves to form the alkali metal salts or soaps of the naphtha-soluble acids thereby affording a means of separating these acids from the neutral materials. Operation difficulties arising from the formation of stable emulsions are minimized by the use of dilute alkali metal salt solutions and if emulsions persist, alcohol may be added to the extraction or de-emulsifiers employed. The alkali metal carbonates employed as extracting solutions in step I preferably contain about 5% by weight of the alkali metal carbonate. Sodium or potassium carbonate are preferred, but carbonates of the other alkali metals may also be employed. The hydrocarbon phase which remains following extraction step I comprises a naphtha solution of nonacidic materials and is introduced into step J. The aqueous phase containing soluble alkali metal salts of the naphtha-soluble acids is introduced from step I into step K.

In step J the hydrocarbon phase is distilled to recover the hydrocarbon solvent which is returned to step D and reemployed in that extraction. A bottoms material remains from the distillation which contains the neutral constituents consisting of unoxidized hydrocarbons and oxygenated nonacidic bodies present in the crude wax oxidate introduced as feed into step C. These neutral materials may, if desired, be recirculated to step A shown in the accompanying figure for reoxidation.

The aqueous carbonate phase introduced into step K is heated therein and a small portion of dissolved hydrocarbon solvent is evaporated and returned together with that evaporated from step E as previously described to step D. The hydrocarbon-free aqueous carbonate phase is removed from step K and introduced into step L wherein the solution is acidified with a strong mineral acid as was used in step F. The amount of mineral acid employed is sufficient to convert the alkali metal soaps of the naphtha-soluble acids to the alkali metal salts of the mineral acid. A slight excess of acid is desirable. The alkali metal soaps of the naphtha-soluble acids are thus decomposed and the naphtha-soluble acids are liberated as a water-insoluble phase. The aqueous phase contains any excess acid employed in the acidification together with the alkali metal salt of the mineral acid. The naphtha-soluble acids liberated from their alkali metal salts in step L are removed therefrom and extracted with water in step M to form a light colored semi-solid mass of substantially pure naphtha-soluble acids having between about 6 and 40 carbon atoms per molecule.

A limited amount of the naphtha soluble acids, the lower molecular weight acids, are extractable in borax solutions from the naphtha soluble acid product prepared as above. There is apparently no complex formation as occurs with the hydroxy acids. Following such a borax extraction, an alkali metal carbonate extraction will remove the remaining naphtha-soluble acids. A combined borax and carbonate extraction of the naphtha-soluble acid product affords a means for effecting fractionation of that product into fractions of naphtha-soluble acids having different molecular weights.

The relative amounts of reagents, the temperatures, and other conditions of operation for producing and refining the organic acids from paraffin oxidates as previously described, may be more fully understood by reference to the following example:

*Example I*

About 8600 parts by weight of a refined petroleum wax, having a melting point between 145° F. and 155° F. were introduced into an oxidation vessel provided with heating and cooling coils. The wax was melted and temperature increased to 270° F. and the oxidation performed under a pressure of about 75 to 80 pounds per square inch gauge, 6.3 atmospheres. Air was employed as the oxidizing medium and was passed through the oxidation vessel at a rate of 5.5 cubic feet per barrel per minute. At the end of 24 hours when the oxidation reaction had begun to progress satisfactorily the temperature was lowered to 250° F. This 24-hour period is termed the induction period during which a small amount of oxidized material is formed and acts somewhat as a catalyst in aiding further oxidation of the material. If desired, oxidation catalysts such as manganese naphthenate may be added to the wax prior to the oxidation. It is possible to decrease the duration of the induction period by adding a small portion of oxidized wax, of the order of 1%, to the wax to be oxidized to aid in initiating the reaction. The course of the reaction is followed by the acid number of samples of material withdrawn from the reactor. The following table illustrates the course of the reaction by showing the acid number of the wax being oxidized at various times during the reaction:

| Time, Hours | Acid No. |
| --- | --- |
| 12 | Neutral |
| 24 | 1.4 |
| 30 | 12.6 |
| 36 | 36.0 |
| 48 | 70.6 |
| 60 | 108.1 |
| 72 | 131.6 |
| 90 | 154.0 |
| 120 | 206.0 |
| 132 | 250.0 |

During this particular oxidation quantities of partially oxidized wax were withdrawn at two different intervals during the run, 680 parts by weight of 36 acid number wax and 1690 parts by weight of 102 acid number wax being withdrawn, and 4560 parts by weight of a wax oxidate having an acid number of 250 was obtained.

The wax oxidate having an acid number of 250 contains considerable amounts of low molecular weight organic acids which are water soluble and were removed by extraction with between 5 and 10 volumes of hot water. A portion of the water washed wax oxidate amounting to 1000 parts by weight was subjected to the oxidate fractionation process previously described. This amount of wax oxidate was mixed as in step C with 1650 parts by weight of a 9.1 weight per cent borax solution at a temperature of about 70° C. The soap complex-naphtha soluble acid mixture thus formed was then extracted three times with 1500 parts by weight of a light gasoline at a temperature of 70° C. and the resulting hydrocarbon and aqueous phases separated. The aqueous borax soap complex phase was subsequently heated as in step E to about 95° C. serving to evaporate the dissolved portion of the gasoline employed in step D. The aqueous soap complex phase was subsequently acidified with 69.5 parts by weight of 42% sulphuric acid in step F wherein the hydroxy acids were separated and subjected to a water extraction as in step G.

The hydrocarbon of gasoline phase of naphtha-soluble acids removed from step D was subjected to a further extraction with 192 parts by weight of a 13 weight per cent borax solution in water at a temperature of 70° C. thereby forming a soap complex with the small amount of remaining hydroxy acids in step H which were not complexed in step C. The borax soap complex phase was separated and returned to step C for reprocessing. The hydrocarbon phase was subsequently extracted as in step I with 1670 parts by weight of a 5% solution of sodium carbonate therein forming the water-soluble sodium soaps of the naphtha-soluble acids present. The aqueous carbonate phase was subsequently separated and heated in step K to a temperature of 95° C. so as to remove traces of gasoline present therein and was subsequently acidified with one equivalent of 42% sulphuric acid per equivalent of naphtha-soluble soap. The naphtha-soluble acids present as their sodium soaps are liberated as acids and were water washed and sent to storage. The hydrocarbon phase containing neutral bodies was distilled for recovery of gasoline and recirculated to step D. The neutral material remaining was in a condition of comparative purity.

The following table indicates per cent recovery and the characteristics of the acid fractions obtained.

| | Percent Yields (Approx.) | Approximate Analysis | | |
| --- | --- | --- | --- | --- |
| | | Acid No. | Sap. No. | Percent Neutrals |
| Hydroxy acids | 34 | 207 | 349 | 3.0 |
| Mixed acids | | | | |
| Naphtha-Soluble acids | 48.5 | 160 | 226 | 3.0 |
| Neutrals | 17.5 | 4 | 87 | |

It is to be understood that although the accompanying description and examples of my invention have been given as applied to the oxidation and subsequent purification of the oxidate formed from a petroleum wax, entirely analogous processes may be carried out on other oxidates obtained from other hydrocarbon fractions with equal ease. Other petroleum hydrocarbon fractions suitable to processing according to my invention as herein described include such fractions as selected paraffinic lubricating oils, foots oil produced in the de-oiling of petroleum wax separated in the refining of lubricating oils, and other paraffinic fractions produced in petroleum refining operations. It is further possible to vary the range of molecular weight of the organic acids produced and refined in the process of my invention by selection of the particular paraffinic hydrocarbon fractions to be oxidized.

The borax extraction solutions employed in the process according to my invention for forming soluble molecular complexes with the hydroxy acids formed in the oxidation hydrocarbon fractions previously described is preferably sodium tetraborate decahydrate, also known as borax. Other alkali metal tetraborates such as those of lithium, potassium, rubidium, and cesium are likewise applicable. In certain cases it may be possible to employ the borates of the alkaline earth metals such as calcium, barium and strontium. However, these are not the preferred borate salts for reasons of low solubility.

The borax soap solutions removed from step D as previously described is ordinarily liquid at normal temperatures, that is, around room temperature. They are nonalkaline, having a pH less than 7 and have the properties of an excellent wetting agent. These soap complexes may be modified in concentration by either the removal or addition of quantities of water so as to form emulsifying, solvatizing, and jelling agents.

In the initial performance of the process as herein described 42% sulphuric acid was employed to decompose the borax soap complex and also the sodium soaps of the naphtha-soluble acids as in steps F and L, respectively. My invention is not to be limited by the use of the particular concentration of this acid and I have found that a wide range of concentrations of any mineral acid is applicable. Such mineral acids as hydrochloric, nitric, phosphoric, etc. may be employed.

The nonpolar solvent employed as an extraction agent in step D is preferably a low boiling liquid hydrocarbon such as gasoline, hexane, or other hydrocarbon fraction prepared in petroleum refining.

A modification of the oxidate acids fractionation process as described which is sometimes of advantage, consists in fractionating the acids by partial neutralization in the aqueous carbonate extraction of step I. By acidification of the phases thus formed containing nonhydroxy acid salts of varying molecular weight, a series of comparatively pure fractions of nonhydroxy acids may be obtained. Such an acid fractionation may be carried out either with the hydroxy acids or the naphtha-soluble acids. These acids may be further fractionated if desired by subsequent neutralization steps with dilute alkali metal carbonate or hydroxide solutions in the case of the carboxylic acids or by complexing the hydroxy acids with further quantities of borax solutions in a series of steps. In the case of the hydroxy acids I have found that those of lower molecular weight and higher acidity will form complexes more readily than those of higher molecular weight and correspondingly lower acidity.

Having described and illustrated my invention and realizing that many modifications thereof will occur to those skilled in the art without departing from the spirit and scope of the following claims, I claim:

1. A method for separating organic hydroxy acids from mixtures with other classes of organic acids having from about 6 to 40 carbon atoms per molecule which comprises contacting said acid mixture with an aqueous borate extractant containing a water-soluble borate salt and separating an aqueous phase containing said hydroxy acids solubilized by said borate extractant from said other classes of organic acids.

2. A method for separating organic hydroxy acids from mixtures with other classes of organic acids formed by oxidation of a petroleum fraction which comprises contacting said acid mixture with an aqueous borate extractant containing an alkali metal borate salt, separating an aqueous phase containing said hydroxy acids solubilized by said borate extractant from said other classes of organic acids, acidifying said aqueous phase to liberate said hydroxy acids, and separating the thus liberated hydroxy acids in substantially pure form.

3. A method according to claim 2 wherein said aqueous borate extractant comprises an aqueous solution containing between about 4% and about 50% by weight of borax.

4. A method for separating organic hydroxy acids from mixtures with other classes of organic acids in a mixture formed by liquid phase oxidation of selected paraffinic hydrocarbon fractions which comprises contacting said acid mixture with an aqueous solution of borax so as to solubilize said hydroxy acids, extracting said acid mixture and said aqueous solution of borax with a paraffinic hydrocarbon solvent in which said hydroxy acids are substantially insoluble and in which said other classes of acids are soluble, separating an aqueous phase containing said hydroxy acids solubilized therein and a paraffinic hydrocarbon phase containing said other classes of acids, acidifying said aqueous phase with a mineral acid thereby liberating said hydroxy acids therefrom, and separating the thus liberated hydroxy acids in substantially pure form.

5. A method according to claim 4 wherein said aqueous solution of borax contains between about 5% and 20% by weight of borax.

6. A method according to claim 4 wherein said paraffinic hydrocarbon solvent comprises a hydrocarbon boiling in the gasoline range.

7. A method according to claim 4 wherein said mineral acid comprises sulphuric acid.

8. A method for separating organic hydroxy acids from mixtures with other classes of organic acids having between about 6 and 40 carbon atoms per molecule and neutrals which comprises contacting said mixture of acids with an aqueous extractant containing between 5% and 20% by weight of borax, extracting said mixture of acids and said aqueous extractant with a paraffinic petroleum naphtha boiling in the gasoline range to form an aqueous phase containing said hydroxy acids as a water soluble borate soap complex and a naphtha phase containing naphtha soluble acids and neutrals together with some remaining hydroxy acids, separating said aqueous phase from said naphtha phase, acidifying said aqueous phase with sulphuric acid thereby liberating said hydroxy acids from said complex, separating the thus liberated hydroxy acids in substantially pure form, extracting said naphtha phase with further quantities of an aqueous extractant containing between 5% and 20% by weight of borax to form said soluble complex with said remaining hydroxy acids thereby separating said hydroxy acids from said naphtha phase, contacting said naphtha phase with an alkaline extractant containing a basically reacting alkali metal salt thereby forming water-soluble alkali metal soaps of said naphtha-soluble acids present in an aqueous phase, separating said aqueous phase containing said naphtha-soluble acids from said naphtha phase containing said neutrals, acidifying said aqueous phase with sulphuric acid so as to liberate said naphtha-soluble acids and separating the thus liberated naphtha-soluble acids in substantially pure form.

9. A method according to claim 8 wherein the contacting with said aqueous extractant containing borax is performed at a temperature of between about 5° C. and about 50° C. above the melting point of said mixture of organic acids.

10. A method according to claim 8 wherein the amount of aqueous borax extractant employed to extract said mixture of organic acids contains between about 0.90 and 0.95 mol of borax per 3 mols of hydroxy acids present in said mixture.

11. A method according to claim 8 wherein said petroleum naphtha is employed in a ratio of about 1 to about 10 volumes of naphtha per volume of said soap complex and naphtha-soluble acids.

12. A method according to claim 8 wherein said alkaline extractant comprises an aqueous solution containing from about 1% to about 10% by weight of an alkali metal carbonate.

13. A method according to claim 8 wherein said alkaline extractant containing an alkali metal salt comprises an aqueous solution containing about 1% and 10% by weight of said basically reacting alkali metal salt.

14. A method according to claim 8 wherein said basically reacting alkali metal salt comprises sodium carbonate.

15. A method for producing organic acids from hydrocarbons which comprises subjecting said hydrocarbons to liquid phase oxidation by contacting said hydrocarbons with a gas containing free oxygen to form a crude oxidate, contacting said oxidate with an aqueous alkali metal borate solution to separate organic acids from neutrals, and recirculating said neutrals for reoxidation.

16. A method for producing organic acids from hydrocarbons which comprises subjecting said hydrocarbons to liquid phase oxidation by contacting said hydrocarbons with a gas containing free oxygen to form a crude oxidate containing hydroxy and naphtha-soluble acids and hydrocarbons, contacting said oxidate with an aqueous alkali metal borate extractant thereby forming a soluble soap complex with said hydroxy acids thereby separating said hydroxy acids from said naphtha-soluble acids and hydrocarbons, extracting said naphtha-soluble acids from said hydrocarbons with an aqueous extractant containing a basically-reacting alkali metal compound, and combining said hydrocarbons with said first-named hydrocarbons to be oxidized.

17. A method for producing organic acids having from 6 to about 40 carbon atoms per molecule from paraffinic hydrocarbons which comprises contacting said hydrocarbons with a gas containing free oxygen at a temperature between about 100° C. to about 200° C. and a pressure between 0.2 and 20 atmospheres to form a crude oxidate containing hydroxy- and naphtha-soluble acids having between 1 and 40 carbon atoms per molecule, washing said crude oxidate with water to extract water-soluble organic acids having between 1 and about 5 carbon atoms per molecule to form a water-washed oxidate, contacting said water washed oxidate with an aqueous solution of sodium tetraborate to form a soluble soap complex with said hydroxy acids, separating said soluble soap complex leaving hydrocarbons, acidifying said soap complex to form a substantially pure hydroxy acid fraction therefrom, and recirculating said hydrocarbons thus recovered for reoxidation.

18. A method according to claim 17 wherein said borate extractant comprises between about 5% and 50% by weight of sodium tetraborate decahydrate in water.

19. In the process for the production of organic acids from selected paraffinic hydrocarbon fractions which comprises subjecting said hydrocarbon fraction to a liquid phase oxidation by contacting said hydrocarbon fraction with a gas containing free oxygen at a temperature between about 100° C. and 200° C. and a pressure of about 10 atmospheres at a rate of between 1 and 20 standard cubic feet per 42 gallon barrel per minute to form a crude oxidate containing hydroxy and other classes of organic acids having between about 1 and 40 carbon atoms per molecule, extracting low molecular weight water-soluble organic acids from said crude oxidate by water extraction thereof to form a water washed oxidate containing organic acids having between about 6 and about 40 carbon atoms per molecule, employing an aqueous solution of borax to extract said organic acids from said water-washed oxidate, separating hydrocarbons from said oxidate, and recirculating hydrocarbons thus recovered for reoxidation, the improvement which comprises eliminating the formation of stable emulsions of said organic acids with said aqueous borax solutions by employing aqueous solutions of borax containing between about 5% and about 20% by weight of borax.

20. A method for producing organic acids from selected paraffin hydrocarbon fractions which comprises heating said hydrocarbon fraction to a temperature of about 120° C. to 150° C., passing a gas containing free oxygen through said hydrocarbon fraction at a rate of between 10 and 15 standard cubic feet per barrel per minute under pressure to effect a liquid phase oxidation of said paraffin hydrocarbon fraction to form a crude oxidate containing a mixture of hydroxy and naphtha-soluble organic acids having from about 1 to 40 carbon atoms per molecule together with neutral organic constituents including hydrocarbons, removing low molecular weight water-soluble acids by extracting said crude oxidate with water to form a water-washed oxidate containing said neutral constituents and hydroxy and naphtha-soluble acids having between about 6 and 40 carbon atoms per molecule, contacting said water-washed oxidate with an aqueous borax solution containing between about 5% and 20% by weight of borax so as to form a water-soluble soap complex containing about 3 molecules of borax per molecule of hydroxy acid with said hydroxy acids present in said water-washed oxidate, extracting the mixture of said soap complex and said naphtha-soluble acids with about 3 volumes of a paraffinic hydrocarbon solvent boiling in the gasoline range thereby dissolving at least a part of said naphtha-soluble acids and neutral constituents thereby forming a mixing comprising an aqueous phase containing said hydroxy acids as soap complexes and a hydrocarbon phase containing naphtha-soluble acids and neutral constituents, separating said aqueous phase from said hydrocarbon phase, acidifying said aqueous phase with a mineral acid so as to liberate substantially pure hydroxy acids from said complex, extracting said hydrocarbon phase with further quantities of an aqueous solution of borax, forming alkali metal salts of said naphtha-soluble acids by extracting said hydrocarbon phase with an aqueous alkaline extractant containing sodium carbonate thereby separating said naphtha-soluble acids from said neutral constituents, heating the thus extracted hydrocarbon phase so as to distill said hydrocarbon solvent leaving a residue comprising said neutral constituents, acidifying said aqueous solution of naphtha-soluble acid soaps thereby liberating naphtha-soluble acids, separating the naphtha-soluble acids thus liberated in substantially pure form, and returning said neutral constituents to be reoxidized.

21. A process which comprises oxidizing a selected petroleum fraction at a temperature between about 120° C. and about 150° C., continuing the oxidation until the acid number of the oxidized mixture thus formed is between about 200 and 300 milligrams of KOH per gram, water washing the oxidized material to remove water-soluble components therefrom, extracting the water-washed material with a solution containing from about 5% to about 20% by weight of sodium borate, acidifying the borate extraction solution to obtain a water-insoluble phase which comprises alpha hydroxy acids and ester acids.

22. A process according to claim 21 wherein said selected petroleum hydrocarbon fraction comprises a petroleum wax.

23. A process for the production of organic acids from hydrocarbons which comprises combining said hydrocarbons with a small quantity of the oxidation product thereof, subjecting the resulting mixture to a liquid phase oxidation through contact with a gas containing free oxygen to form a crude oxidate containing hydroxy acids, ester acids, naphtha-soluble acids and hydrocarbons, contacting said oxidate with an aqueous solution of an alkali metal tetraborate thereby forming a soluble soap complex with said hydroxy acids and said ester acids leaving said naphtha-soluble acids and said hydrocarbons undissolved, separating the aqueous phase from the insoluble portion of said oxidate containing naphtha-soluble acids and hydrocarbons, separating said hydrocarbons from said naphtha-soluble acids by extracting said acids with an aqueous extractant containing a basically reacting alkali metal compound, and combining the hydrocarbons thus recovered with said hydrocarbons to be oxidized.

24. A process for producing organic acids which comprises introducing about 1% by weight of the oxidation product of a selected petroleum hydrocarbon into said selected petroleum hydrocarbon, oxidizing the resulting mixture in the liquid phase with a gas containing free oxygen to form a crude oxidate containing hydroxy acids, ester acids, naphtha-soluble acids and hydrocarbons, contacting said oxidate with an aqueous alkali metal tetraborate solution to dissolve said hydroxy acids and said ester acids, separating the aqueous solution thus formed from said naphtha-soluble acids and said hydrocarbons, acidifying the aqueous phase with a strong mineral acid to liberate said hydroxy acids and ester acids and separating the liberated acids from the aqueous phase.

25. In the process for the production of organic acids which comprises subjecting a paraffinic hydrocarbon fraction to liquid phase oxidation at temperatures between 100° C. and 200° C. in the presence of a gas containing free oxygen to form a crude oxidate containing hydroxy acids, ester acids, naphtha-soluble acids, and hydrocarbons having between about 1 and 40 carbon atoms per molecule, extracting low molecular weight water-soluble organic acids by water extraction leaving a water-washed oxidate containing acids having between 6 and about 40 carbon atoms per molecule, employing an aqueous solution of borax to extract hydroxy acids and ester acids as an aqueous extract from said naphtha-soluble acids and said hydrocarbons, recovering hydroxy acids and ester acids from said extract by acidification, separating said naphtha-soluble acids from said hydrocarbon, and recycling said hydrocarbons thus recovered with said paraffinic hydrocarbon fraction to be oxidized, the improvement which comprises introducing about 1% by weight of said oxidate into the mixture of said paraffinic hydrocarbon fraction and recovered hydrocarbons, and oxidizing the resulting mixture.

26. A composition of matter having the properties of a wetting agent, formed by oxidizing a selected paraffinic hydrocarbon fraction to form a crude oxidate containing hydroxy acids and ester acids, extracting water-soluble acids having less than about 6 carbon atoms per molecule by contacting said crude oxidate with water leaving a water-washed oxidate, contacting the said water-washed oxidate with an aqueous solution of an alkali metal tetraborate salt thereby forming molecular complexes with said hydroxy acids and ester acids in said water-washed oxidate, and separating the extract thus formed as said composition of matter, the molar ratio of hydroxy acids and ester acids to alkali metal tetraborate salt being about 3 to 1.

27. A composition of matter having the properties of a wetting agent which comprises the reaction product of about 3 mols of a mixture of hydroxy acids and ester acids with about 1 mol of sodium tetraborate, said acids having between about 6 and about 40 carbon atoms per molecule and being formed by liquid phase oxidation of petroleum wax.

ORIN D. CUNNINGHAM.

REFERENCES CITED

The following references are of record in the file of this patent:

UNITED STATES PATENTS

| Number | Name | Date |
| --- | --- | --- |
| 1,947,989 | Hellthaler et al. | Feb. 20, 1934 |
| 2,055,095 | Beller | Sept. 22, 1936 |
| 2,153,302 | Ewing | Apr. 4, 1939 |
| 2,278,425 | Colbeth | Apr. 7, 1942 |

OTHER REFERENCES

C. A., vol. 35, page 3186 (1941).
C. A., vol. 32, page 5685 (1938).
Ber., vol. 57, pages 1337–42 (1924).